INVENTORS
ROBERT W. CASHMAN
ANTHONY WASCO, JR.
BY

ATTORNEYS

Aug. 3, 1965  R. W. CASHMAN ETAL  3,198,588
SLIDE ASSEMBLY
Filed Feb. 9, 1962  3 Sheets-Sheet 2
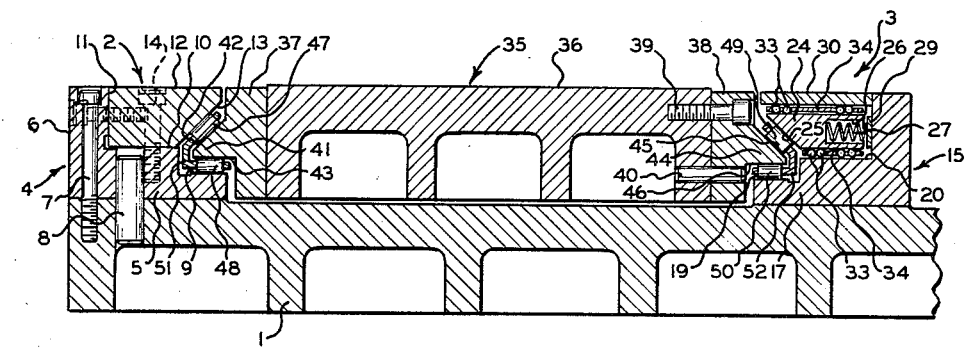
FIG. 2
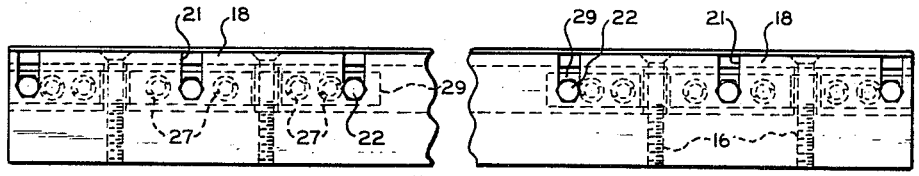
FIG. 3
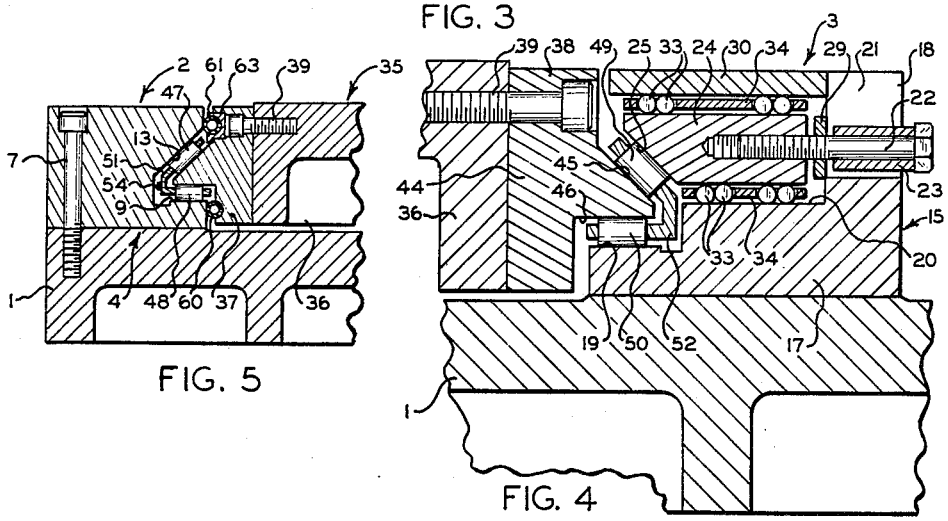
FIG. 5
FIG. 4
INVENTORS
ROBERT W. CASHMAN
ANTHONY WASCO, JR.
BY
ATTORNEYS United States Patent Office 3,198,588
Patented Aug. 3, 1965

3,198,588
SLIDE ASSEMBLY
Robert W. Cashman and Anthony Wasco, Jr., Saginaw, Mich., assignors to Saginaw Machine and Tool Company, Saginaw, Mich., a corporation of Michigan
Filed Feb. 9, 1962, Ser. No. 172,266
12 Claims. (Cl. 308—6)

This invention relates to slide assemblies of the kind adapted for use on machinery such as lathes, boring machines, grinding machines, milling machines, or in any other instance where it is desirable to provide a reciprocating slide or carriage.

An object of this invention is to provide a slide assembly having a reciprocable carriage slideable between two guide surfaces and wherein the carriage is constantly urged into guiding association with one guide surface so as thereby to provide the truest possible path of reciprocation.

Another object of the invention is to provide a slide construction of the kind referred to and having yieldable means acting on the carriage so as automatically to compensate for any wear and to allow for some freedom of lateral movement of the carriage as a safeguard against damage to the slide or the machine on which it is mounted.

A further object of the invention is to provide rotatable, anti-friction means between the slide and its guide surfaces so as to minimize the possibility of wear of such surfaces.

Another object of the invention is to provide sealing means in a slide assembly of the kind described to prevent the entry of chips and other foreign matter between the guide surfaces of the slide and its supporting means.

A further object of the invention is to provide novel means for permitting free movement of the anti-friction means associated with the slide structure within certain limits.

Another object of the invention is to provide spring biasing means for a slide construction of the kind indicated and means for controlling the spring biasing devices to facilitate assembly and disassembly of the parts of the slide construction.

Other objects and advantages of the invention will be pointed out specifically or will become apparent from the following description when it is considered in conjunction with the appended claims and the accompanying drawings, wherein:

FIGURE 2 is a sectional view taken on the line 2—2 of FIGURE 1;

FIGURE 3 is a fragmentary, side elevational view of the apparatus shown in FIGURE 1;

FIGURE 4 is an enlarged, fragmentary view of a portion of the apparatus shown in FIGURE 2;

FIGURE 5 is a fragmentary view similar to FIGURE 2, but illustrating a somewhat modified form of the invention;

Figure 1:
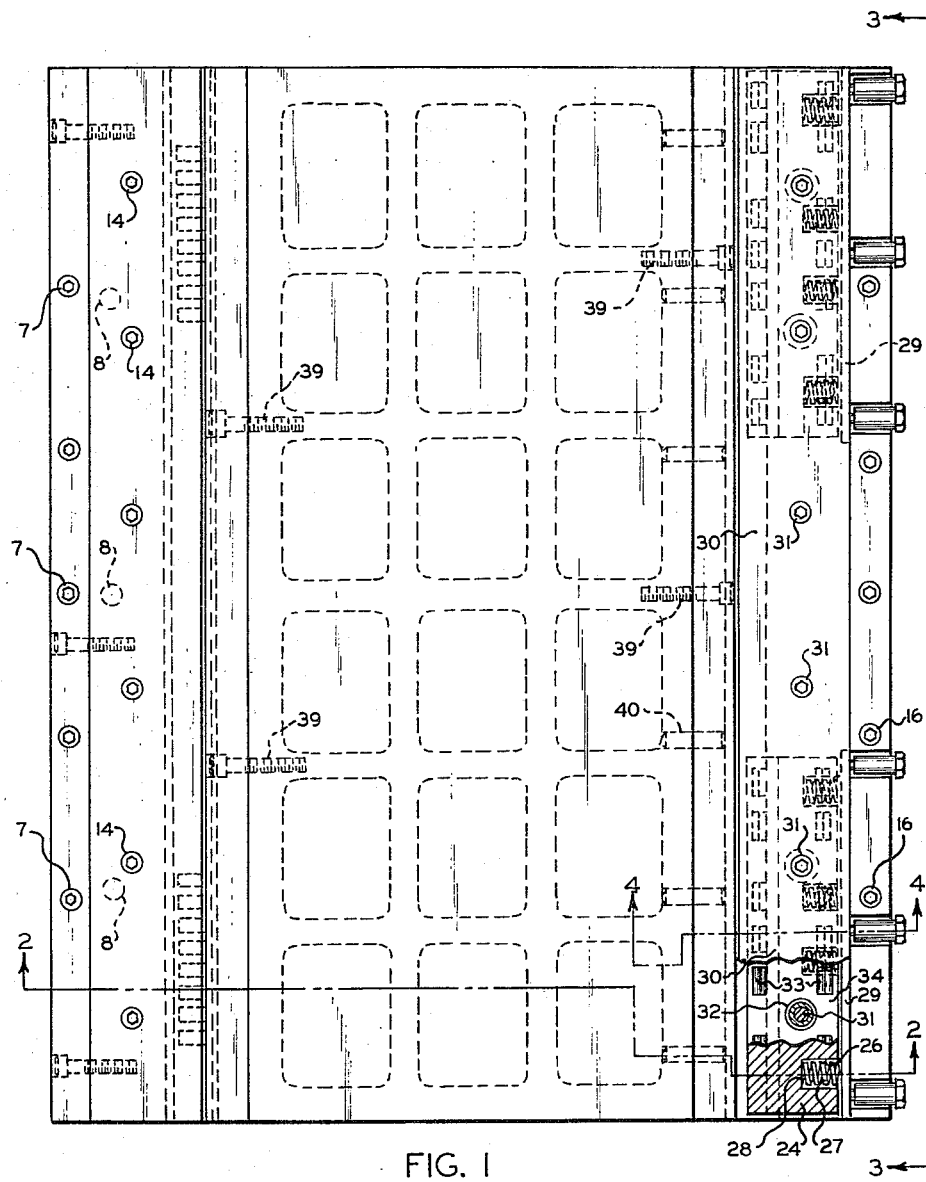
FIGURE 1 is a top plan view, partly in section, of a slide assembly constructed in accordance with one embodiment of the invention.

Apparatus constructed in accordance with the embodiment of the invention disclosed in FIGURES 1, 2 and 3 comprises a base member 1 which may be the bed of a grinding, boring, milling or other machine, or, alternatively, the base 1 may be mounted in any suitable manner on the bed of such a machine. Adjacent opposite sides of the base 1 are mounted a pair of guide structures 2 and 3. The guide structure 2 comprises a generally L-shaped member 4 having a leg portion 5 that rests upon the base 1 and generally right angular, upstanding leg or wall 6. The member 4 may be fixed to the base 1 by means of suitable screws 7 and dowel pins 8. The leg 5 of the member 4 has a pair of stepped, precisely machined surfaces 9 and 10, and the wall 6 has a precisely machined surface 11. Mounted on the member 4 and in engagement with the surfaces 10 and 11 is a longitudinally extending guide member 12 having a precisely machined, oblique guide surface 13 that overhangs the guide surface 9. The member 12 may be secured to the member 4 by suitable means such as bolts 14.

The guide structure 3 comprises a generally rightangular element 15 that parallels the guide member 2 and is secured to the base 1 in spaced relation to the guide member 2 by suitable means such as screws 16. The member 3 includes a base leg 17 and an upstanding leg or wall 18, the base leg 17 having a pair of stepped, precisely machined surfaces 19 and 20 provided thereon. At intervals along its length, the upstanding leg 18 of the guide element 15 is provided with slots or notches 21 each of which is adapted to receive a headed screw 22 having a portion of its shank surrounded by a loosely fitting sleeve 23 that is of a length somewhat greater than the thickness of the leg portion 18.

Mounted on the surface 20 of the guide element 15 is a plurality, e.g., two, shiftable guide blocks or members 24 each of which has an obliquely undercut guide surface 25 at one side which overhangs the surface 19. The opposite side of each guide block 24 is tapped for threaded reception of the screws 22 and is provided with a plurality of blind openings 26 (see FIGURE 1) in each of which is mounted a powerful compression spring 27. One end of each spring 27 bears against the base 28 of its associated opening 26 and the other end of each spring bears against an abutment bar 29 which is interposed between each slide block 24 and the wall 18, the bars being apertured for loose reception of the screws 22. The arrangement is such that the springs 27 react between the blocks 24 and the bars 29 so as constantly to urge the blocks 24 toward the guide member 2. The force of the springs may be controlled by the screws 22. That is, rotation of the screws 22 in such direction as partially to withdraw them from the blocks 24 will enable the springs to exert their maximum force on the blocks, whereas rotation of the screws in a direction to insert them in the blocks will cause the sleeves 23 and the bars 29 to compress the springs against the bases of their openings 26 and curtail, or even completely overcome, the force by which the block 24 is urged toward the guide member 2.

The guide blocks 24 are trapped between the surface 20 of the guide element 15 and a top plate 30 which overlies the blocks 24 and is secured to the base leg 17 by suitable screws 31. Some of the screws 31 pass through the blocks 24 and in such cases the blocks 24 are provided with enlarged openings 32 (FIGURE 1) of such size as to permit relative movement between the blocks and the screws without interference therebetween.

In some cases it may be desirable to include antifriction rollers 33 between the blocks 24 and the members 17 and 30 so as to facilitate lateral movements of the blocks. The rollers 33 may be received in openings formed in plate-like retainers 34 that are less thick than the diameter of the rollers 33.

Interposed between the guides 2 and 3 is a slide or carriage member 35 comprising a central body member 36 having guide elements 37 and 38 secured to its opposite edges. The guide elements 37 and 38 preferably are formed separately from the body member 36 and secured to the latter by suitable means such as bolts 39 and dowel pins 40, although the elements 37 and 38 may, if desired, be welded to the body member. By forming the guide elements 37 and 38 separately from the body member, it is possible to confine the use of high grade, hardened metal to the guide elements 37 and 38, as opposed to forming the entire carriage 35 of such material.

The guide element 37 has a laterally projecting tongue 41 having a guide surface 42 that parallels the guide surface 13, and a guide surface 43 that parallels the guide surface 9. The guide element 38 has a similar tongue 44 having guide surfaces 45 and 46 which parallel the guide surfaces 25 and 19, respectively. Between the guide surfaces 13 and 42 is a plurality of rollers 47, and a plurality of similar rollers 48 are interposed between the guide surfaces 9 and 43. A set of rollers 49 similar to the rollers 47 is interposed between the guide surfaces 25 and 45 and a similar set of rollers 50 is interposed between the guide surfaces 19 and 46. None of the rollers is journaled; instead, each roller engages both of the guide surfaces between which it is interposed. However, a retaining cage 51 of less thickness than the diameters of the rollers 47 and 48 is provided with openings for receiving the latter and a similar retaining cage 52 receives the rollers 49 and 50.

The construction and arrangement of the parts thus far described are such that loosening of the screws 22 will enable the springs 28 to exert a force on the guide blocks 24 and urge them laterally toward the guide member 2. The force of the springs is transmitted by the guide blocks 24 to the rollers 25 and to the guide surface 45. The force applied to the guide-surface 45 is resolved into a resultant force having a component toward the base 1 and a second component toward the guide member 2. The force of the springs 28 is transmitted by the member 35 to the guide member 2 via the rollers 47 and 48 and again this force is resolved into two components like those referred to earlier. As a consequence, the carriage 35 is constantly urged downwardly and towards the left, as viewed in FIGURE 2, so that the guide surfaces 9 and 13 constitute the guides for the carriage 35. By orienting all parts of the slide assembly to the guide surfaces 9 and 13, the truest possible reciprocating path for the carriage 35 may be established. The springs 28 are of such strength as to require substantial pressure to be exerted on the carriage before it can be moved laterally against the force of the springs, but it is possible to effect such movement of the carriage if sufficient force is applied. As a result, the slide is capable of limited lateral movement relative to the base 1 in a direction toward the guide 3 if sufficient force is applied to the carriage to overcome the force of the springs 28.

Figure 8:
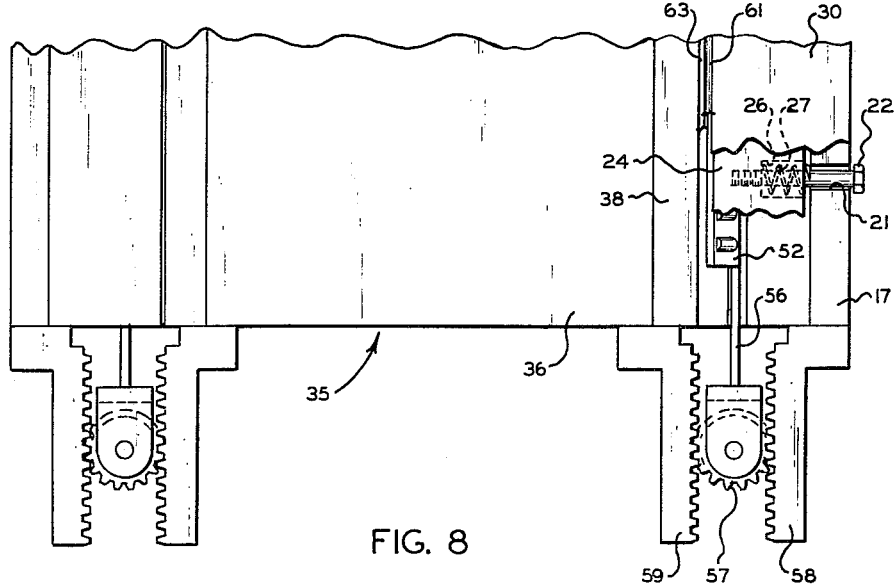
FIGURE 8 is a fragmentary view similar to FIGURE 1, but illustrating another embodiment of the invention.

The carriage is reciprocable between the guides 2 and 3 and due to the sets of rollers 47, 48 and 49, 50, the carriage moves freely and easily. Because each roller of each set of rollers engages both a stationary guide and the carriage, each of the retainers 51 and 52 is movable with the carriage, but for a distance only half as great as the distance the carriage moves in any one direction. The movement of the retainers 51 and 52 therefore is relative both to the carriage and to the fixed guides 2 and 3. Since the retaining cages 51 and 52 move relatively to the carriage 35 and to the fixed guide members 2 and 3, it is preferred that the apparatus include means that permits such relative movement but restrains movement of the retaining members an undue amount. Such restraining means may be of the kind shown in FIGURES 5–7 or in FIGURE 8.

Figure 6:
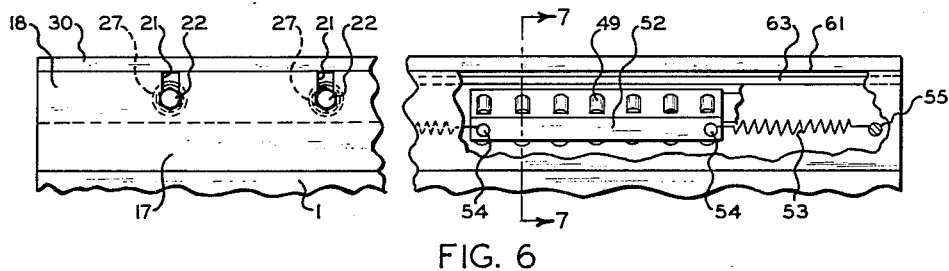
FIGURE 6 is a view similar to FIGURE 3, but with certain parts being broken away for purposes of illustration.
Figure 7:
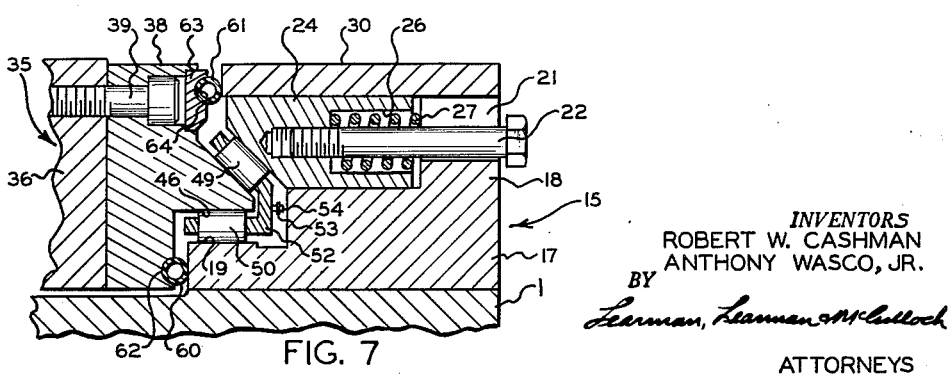
FIGURE 7 is a sectional view on an enlarged scale and taken on the line 7—7 of FIGURE 6.

In FIGURES 5–7 the restraining means comprises a spring 53 located at each end of each retainer, the spring being secured at one end to a post 54 mounted on the associated retainer and having its other end anchored to a post 55 that is mounted on the adjacent part 5 or 17. Alternatively, each retainer 51 and 52 may be provided with an arm 56 (see FIGURE 8) that extends beyond the slide 35 and at the free end of which is journaled a pinion 57. The pinion may mesh with a pair of racks 58 and 59, one of which is welded or otherwise fixed to the associated element 5 or 17 and the other of which is welded or otherwise fixed to the carriage 35. In any event, the retainer cages 51 and 52 are capable of movement relative to the movable and fixed guide members upon relative movement of such members, but are restrained against movement at all other times.

The embodiments of the invention disclosed in FIGURES 5, 6, 7, and 8 differ from the embodiment shown in FIGURES 1, 2, 3, and 4 in that the bars 29 are eliminated. In addition, the chambers 26 that receive the springs 27 are coaxial with the tapped openings in the block 24 that receive the screws 22, and the springs 27 surround the shanks of their associated screws. Moreover, FIGURE 5 illustrates a construction in which the guide member 2 is formed from one piece of material, rather than from two as is the case of the construction shown in FIGURE 1. These changes do not affect the operation of the apparatus; they permit the apparatus to be manufactured with fewer parts.

In some instances it may be desirable to prevent the entry of chips and other foreign matter to the spaces between the slide 35 and the stationary guides. This may be accomplished by providing seals 60 and 61 between each side of the slide 35 and the adjacent fixed guide member 2 or 3. In the disclosed embodiment the seals 60 and 61 comprise elongated tubes of a plastic material such as nylon or the like. Each tube 60 may be received in a semicircular recess 62 formed either in the associated guide member 37, 38 or in the associated member 4, 15, and each tube 61 may be mounted in a similar manner if the guide members 37 and 38 are welded or otherwise fixed to the body member 36 in such manner as to eliminate the necessity for the screws 39. In those instances where the screws 39 are used, however, the side edges of the guide members 37 and 38 may be provided with slots for the reception of longitudinally extending bars 63 each of which has a semicircular groove 64 therein in which the seal 61 is received. The depth of the grooves 62 and 64 should be such that the tubes 60 and 61 span the distance between the carriage and the fixed guide members and bear against the latter so as completely to seal the slots between the movable carriage and the stationary guide members.

The disclosed embodiments are representative of presently preferred forms of the invention, but are intended to be illustrative rather than definitive thereof. The invention is defined in the claims.

What is claimed is:

1. A slide assembly comprising a base member; a first guide member having a guide surface thereon; means fixedly mounting said first guide member on said base member; a second guide member having a guide surface thereon; means mounting said second guide member on said base member for movements toward and away from said first guide member; a slide member slideably interposed between said guide members and having guide surfaces thereon complemental to the guide surfaces on said guide members; yieldable means constantly acting on said second guide member and forcibly but yieldably urging the latter toward said first guide member so as slideably to clamp said slide member between said guide members; and means connected to said second guide member operable to move the latter away from said first guide member.

2. The assembly set forth in claim 1 including roller means interposed between the guide surfaces of said slide member and said guide members.

3. A slide assembly comprising a base member; a first guide member fixed on said base and having a guide surface obliquely overhanging said base; a second guide member spaced from said first guide member and having a guide surface obliquely overhanging said base; means mounting said second guide member on said base for movements in a plane toward and away from said first guide member; a slide member slideably interposed between said first and second guide members and having guide surfaces confronting and complementing the guide surfaces on said guide members; and yieldable force transmitting means constantly acting on said second guide member and forcibly urging the latter toward said first guide member to yieldingly clamp said slide member therebetween, the guide surfaces on said guide members and said slide member being so shaped that the force of said transmitting means is resolved into two components, one of which urges said slide member toward said first guide member in said plane and the other of which urges said slide member in a plane normal to the first mentioned plane.

4. The assembly set forth in claim 3 wherein said other component urges said slide member toward said base.

5. The assembly set forth in claim 3 including rotatable means interposed between the guide surfaces of said slide member and each of said guide members.

6. The assembly set forth in claim 5 including sealing means interposed between said slide member and each of said guide members and overlying said rotatable means.

7. The assembly set forth in claim 5 wherein said rotatable means comprise journalless rollers, and including cage means of less thickness than the diameter of said rollers, said cage means having a number of openings corresponding to the number of said rollers and in each of which is received one of said rollers.

8. The assembly set forth in claim 7 including restraining means reacting between said cage means and at least one of said members operable to permit limited movement of said cage means relative to said members in response to relative movement of said slide and guide members.

9. A slide assembly comprising a base; a pair of spaced apart, parallel guide members secured to said base, one of said guide members having a guide surface thereon obliquely overhanging said base; a guide element movably supported on the other guide member of said pair of guide members, said guide element having a guide surface thereon obliquely overhanging said base; a slide member interposed between said guide members and having opposed guide surfaces complementary to the guide surfaces on said one of said guide members and on said guide element; and yieldable force transmitting means constantly reacting between said other guide member of said pair of guide members and said guide element and yieldably urging the latter toward said one guide member, the guide surfaces on said slide member, said one guide member, and said slide element being so shaped that the force of said transmitting means is resolved into two components only, one of which urges said slide member toward said one guide member and the other of which urges said slide member toward said base.

10. A slide assembly comprising a base; a first guide member; means securing said first guide member to said base; a second guide member parallel to and spaced from said first guide member; means mounting said second guide member on said base for movements toward and away from said first guide member, each of said guide members having a guide surface thereon; a slide member interposed between said guide members and having guide surfaces thereon confronting the guide surfaces on said guide members; abutment means interposed between said second guide member and its said mounting means and engageable with the latter; yieldable force transmitting means interposed between said abutment means and said second guide member and operable to urge the latter constantly but yieldably toward said first guide member when said abutment means engages said mounting means; and means interconnecting said abutment means and said second guide member and operable to effect movement of said abutment means toward said second guide member and disengagement of said abutment means and said mounting means.

11. The construction set forth in claim 10 wherein said interconnecting means comprises headed screw means threaded into said second guide member and sleeve means on said screw means operable to engage said abutment means.

12. The construction set forth in claim 10 wherein the confronting guide surfaces of said guide members and said slide member are so shaped that the force of said transmitting means is resolved into two components only, one of which urges said slide member toward said first guide member and the other of which urges said slide member toward said base.

References Cited by the Examiner

UNITED STATES PATENTS

| 1,917,926 | 7/33 | Decker. | |
| 2,342,302 | 2/44 | Rubissow | 308—6 |
| 2,672,378 | 3/54 | McVey | 308—6 |
| 2,711,934 | 6/55 | Richenmann | 308—9 |
| 2,810,062 | 10/57 | Kaunitz | 308—6 |
| 2,866,505 | 12/58 | Forkner | 308—6 |
| 3,024,073 | 3/62 | Krueger | 308—6 |

FOREIGN PATENTS

| 1,266,350 | 5/61 | France. |
| 690,230 | 4/53 | Great Britain. |
| 866,834 | 5/61 | Great Britain. |

OTHER REFERENCES

New Departure Handbook 1951, vol. II, copy available from New Departure, Bristol, Connecticut.

WILLIAM W. DYER, JR., *Primary Examiner.*

RICHARD H. EANES, JR., *Examiner.*